(12) United States Patent
Lau et al.

(10) Patent No.: US 8,867,100 B2
(45) Date of Patent: Oct. 21, 2014

(54) IMAGE QUANTIZATION FOR DIGITAL PRINTING

(75) Inventors: Daniel L. Lau, Lexington, KY (US); Gonzalo R. Arce, Newark, DE (US)

(73) Assignee: LRC Solutions, LLC., Newark, DE (US)

( * ) Notice: Subject to any disclaimer, the term of this patent is extended or adjusted under 35 U.S.C. 154(b) by 677 days.

(21) Appl. No.: 12/820,733

(22) Filed: Jun. 22, 2010

(65) Prior Publication Data

US 2011/0310436 A1     Dec. 22, 2011

(51) Int. Cl.
*H04N 1/405*     (2006.01)
*H04N 1/40*      (2006.01)

(52) U.S. Cl.
CPC ......... *H04N 1/40087* (2013.01); *H04N 1/4057* (2013.01)
USPC ....... 358/3.03; 358/3.05; 358/3.06; 358/3.09; 358/3.13; 358/3.19; 358/3.2; 358/3.21; 358/3.22

(58) Field of Classification Search
CPC ............ H04N 1/40087; H04N 1/4052; H04N 1/4057; H04N 1/40062; H04N 1/405
See application file for complete search history.

(56) References Cited

U.S. PATENT DOCUMENTS

| | | | | |
|---|---|---|---|---|
| 5,444,551 A | * | 8/1995 | Miller et al. ................. | 358/3.14 |
| 5,742,405 A | * | 4/1998 | Spaulding et al. ............. | 358/3.1 |
| 2002/0186267 A1 | * | 12/2002 | Velde et al. .................... | 347/15 |
| 2006/0238812 A1 | * | 10/2006 | Kang ............................. | 358/3.06 |
| 2010/0103469 A1 | * | 4/2010 | Araki et al. ................... | 358/3.26 |

OTHER PUBLICATIONS

K. Spaulding, Q. Yu, K.J. Parker, and R. Miller, "Digital Multitoning Evaluation with Human Visual Model," in *Recent Progress in Digital Halftoning II*, R. Eschbach, ed., IS&T, Springfield, VA, pp. 51-57, 1999.

K. Spaulding, Q. Yu, K.J. Parker, and R. Miller, "Improved Digital Multitoning with Overmodulation Scheme," Proceedings of SPIE, pp. 362-373, 1998.

R. Miller and C. Smith, "Mean-Preserving Multilevel Halftoning Algorithm," in Proceedings, SPIE—The International Society of Optical Engineering: Human Vision, Visual Processing and Digital Display IV, J.P. Allebach and B.E. Rogowitz, eds., vol. 1913, SPIE, pp. 367-377, Feb. 1993.

S. Sugiura and T. Makita, "An Improved Multilevel Error Diffusion Method," in Recent Progress in Digital Halftoning II, R. Eschbach, ed., IS&T, Springfield, VA, pp. 120-126, 1999.

H. Ochi, "High Quality Multilevel Error Diffusion with Layered Structure," 140th Research Meeting for Image Processing and Communication, Society of Electronic Communication in Japan, pp. 17-20, 1994.

* cited by examiner

*Primary Examiner* — Benny Q Tieu
*Assistant Examiner* — Haris Sabah
(74) *Attorney, Agent, or Firm* — Novak Druce Connolly Bove + Quigg LLP

(57) ABSTRACT

An image may be quantized into a pattern of dots, e.g., for devices capable of printing dots of variable size and variable color intensity. One may use a pre-determined mapping of the continuous-tone intensity value into a discrete vector of intensity values, and each intensity value may then be processed by a set of binary quantizers. The resulting binary vector may then be mapped into a combination of available dot sizes and color intensities. Through a scalar multiplier, the pre-determined mapping of continuous-tone intensity values may be used at multiple print resolutions.

27 Claims, 4 Drawing Sheets

IMAGE QUANTIZATION FOR DIGITAL PRINTING

Various embodiments of the invention may relate to the quantization of a digital raster image into a pattern of printed and not printed dots, e.g., for devices capable of printing dots of variable size and/or variable color intensity.

BACKGROUND

Digital halftoning is the process of converting a monochrome, continuous-tone, raster image or photograph into a binary pattern of printed and not printed dots. In the case of color printing, images may be produced by superimposing multiple halftone images where each component halftone corresponds to a specific color of ink such as, for example, cyan, magenta, yellow, and black (CMYK).

When categorizing the various methods of halftoning, methods that produce varying shades of ink intensity using a periodic pattern of printed-dot clusters that vary in size according to tone are generally referred to as amplitude modulated or AM halftoning. The process of converting the continuous-tone picture elements (pixels) of the original raster image into printed and not printed dots may typically be performed using a pixel-wise thresholding operation comparing a subject pixel with a threshold element from a dither matrix whose row and column index within the matrix corresponds to the row and column coordinate of the subject pixel using some predetermined mapping operation.

In the case of frequency modulated or FM halftoning, printed dots may be arranged in a dispersed, often aperiodic, pattern, where shades of gray may be represented by same-sized printed-dot clusters whose spacing apart varies with the ink intensity level. In addition to being performed by a dither matrix, FM halftoning may also be performed using error-diffusion, where a subject pixel may be quantized to a binary printed/not printed value with the resulting quantization error added into soon-to-be-processed pixels within a local neighborhood about the subject pixel.

With the advent of modern digital printers based upon electrophotographic (laser) as well as inkjet printing mechanisms, the process of converting a continuous-tone image into printed dots is complicated by these modern primers' ability to print dots of variable size. In the case of laser printers, it is now possible to modulate the intensity of the laser beam and, thereby, modulate the size of the printed spot formed on the photosensitive drum. With regard to inkjet printers, it is possible to now modulate the volume of ink dispersed in each ejected droplet or to deposit multiple droplets at the same location on the page.

By depositing a larger volume of ink at a given location, an inkjet printer can modulate the size of the resulting printed dot. Inkjet printers are also readily available that, in addition to modulating the size of ejected droplets, make use of two or more separate inks representing the same primary color but with different color intensities. For example, six color inkjet printers typically employ two shades of cyan (cyan and light-cyan) and two shades of magenta (magenta and light-magenta). Eight color inkjets typically employ three shades of black (black, light-black, and light-light-black).

With regard to the conversion of a monochrome, continuous-tone, raster image or photograph into patterns of printed and not printed, variably-sized, variable color intensity dots, first-generation processing means may typically employ traditional methods of halftoning incorporating multi-level quantizers. Such methods are sometimes referred to as the process of digital multi-toning. The problem with these first generation methods is that they may often produce banding artifacts in areas of smooth gradients when transitioning from one available dot size or color-intensity to another. For this reason, some later generations of multitoning processes created patterns composed of at least three different available dot sizes/color-intensity dots, but this novelty has typically occured at the price of increased computational complexity for the quantizing means.

SUMMARY OF EMBODIMENTS OF THE INVENTION

In order to produce digital multitones in accordance with various embodiments of the present invention, a pixel of a monochrome, continous-tone, raster image may be processed by first establishing a mapping of the continuous, scalar, intensity value into a set of two or more scalar intensity values, where each value may correspond to an available dot size and/or color intensity. These values within this vector may correspond to the likelihood that the resulting printed dot will be of that component size and/or color intensity. For computational ease, this process may be performed by a look-up table where the subject intensity value is an index into the memory space used to store the table. Having established a vector of scalar intensity values, each scalar value of this vector may then be processed by means of a binary quantizer in order to establish a printed or not-printed status for each component of the vector. Based upon the printed status for each element in the post-quantized vector, the size and/or color-intensity of the final printed dots may then be derived according to a pre-determined mapping of the post-quantized vector.

BRIEF DESCRIPTION OF THE DRAWINGS

Various embodiments of the invention are described below in conjunction with the accompanying drawings, in which.

DETAILED DESCRIPTION OF VARIOUS EMBODIMENTS

Figure 1:
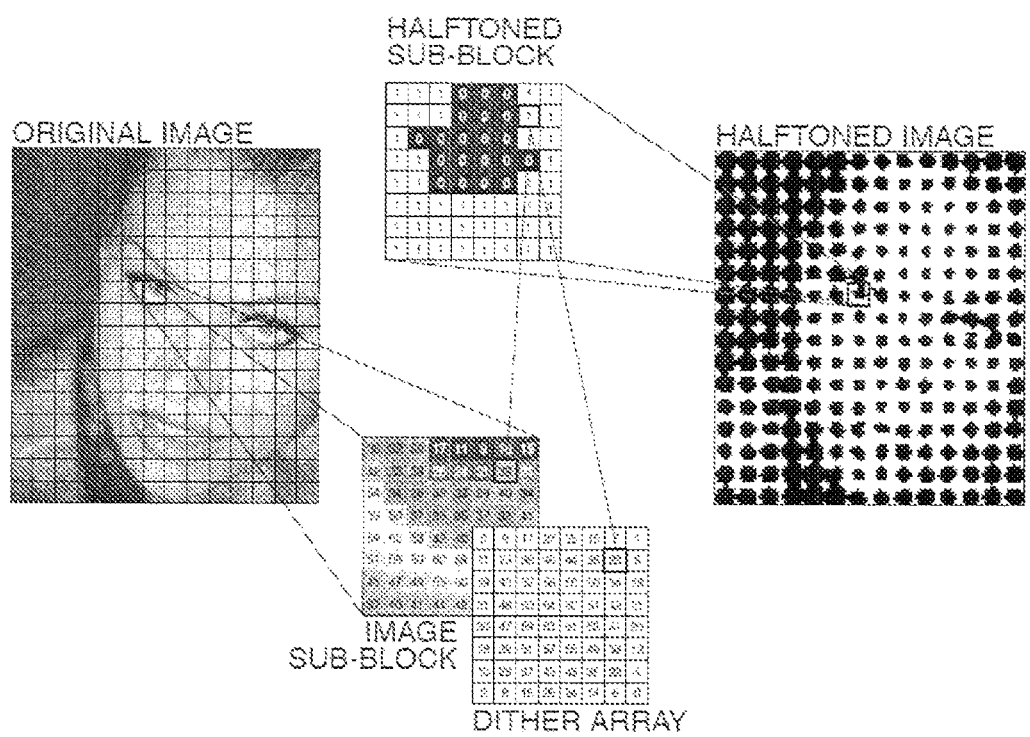
FIG. 1 is an illustration of digital halftoning by means of a dither array that may be applicable to various embodiments of the invention.

In a computer, an image such as a photograph or painting may be stored as an array or matrix of light intensity values such that each individual picture element within this array is referred to as a pixel. Assuming we have such a digital image, which we will refer to as X, then the term $x[m,n]$ is used to refer to the specific picture element corresponding to the $m^{th}$ row and $n^{th}$ column. For example, the term $x[1,1]$ is the pixel in the top or $1^{st}$ row at the very left edge in the $1^{st}$ column while $x[10,21]$ is the pixel corresponding to the $10^{th}$ row and $21^{st}$ column. Sometimes as a means of simplifying the notation, $x[n]$ is used to refer to a specific pixel value where n is understood to be an integer pair like, for example, $n=(5,1)$ to refer to $x[5,1]$. Now as a number, $x[m,n]$ is a measure of how bright this particular pixel is such that larger values indicate brighter pixels.

Exactly how the number stored in $x[m,n]$ is translated into a brightness measure depends on exactly what data type the image is stored in the memory of the computer. Usually an image is stored either as a floating point number, where the term x[m,n] is a fractional/decimal number between 0.0 for solid black and 1.0 for solid white, or as a fixed-precision integer value; however, the invention is not limited to a particular representation type. In the case of 8 bits per pixel, x[m,n] may be an integer ranging from 0 for solid black to 255 for solid white. At 16 bits per pixel, x[m,n] may range from 0 for solid black to 65,535 for solid white.

Now in certain display devices such as an ink-jet or electrophotographic (laser) printer, images can only be displayed as either black or white pixels. This creates a significant problem when a digital computer with a cathode ray tube (CRT) or liquid crystal (LCD) display, capable of displaying a continuous range of brightness levels from black to white, wants to print the image to paper. So what may happen is that the continuous tone image may be transformed or converted into a binary image, which may be composed of just values of 0 or 1, through the process of digital halftoning. The binary image may then be printed such that black pixels are displayed as printed dots and white pixels as unprinted dots.

Specifically, digital halftoning may try to create a pattern of evenly distributed dots such that the fraction of dots printed, over a small area, equals the desired gray level of the image in that same area. By doing so, halftoning is trying to take advantage of the human visual system's behavior to blur fine details and, thereby, create an illusion that this pattern of black printed dots on a white background is a continuous shade of gray. The manner in which a halftoning algorithm distributes printed dots is not a trivial problem, as the specific distribution greatly impacts the visual fidelity of the printed image. As such, volumes of scientific literature have been written on the topic of halftoning.

When comparing the operation of various halftoning algorithms, experts in the field generally categorize a technique based upon the manner in which it distributes printed dots. Specifically in the case where printed dots form a regular pattern of printed-dot clusters whose sizes vary with the intended gray level, the halftoning algorithm is referred to as an amplitude modulation (AM) technique where dark shades of gray may be represented by large, possibly overlapping clusters while light shades may be represented by small clusters. In FIG. 1, we demonstrate the process of AM halftoning where the original, continuous-tone image may be converted into a binary halftone where the pixels set to black are ordered into clusters creating the impression of a regular pattern composed of seemingly round dots that increase and decrease in size according to the gray levels of the original. The alternative, frequency modulated (FM) techniques may produce patterns of printed dots whose spacing apart may vary with the intended gray level, where dark shades of gray may be represented by a tight packing of printed dots while light shades may be represented by a loose packing.

Now when describing the process by which an algorithm converts a continuous tone image into a binary halftone, the majority of techniques can either be classified as performing halftoning by means of a dither array or by means of error diffusion. In the case of a dither array, a raster image processor (RIP) unit may be used to convert each pixel of the original image from a continuous tone value directly into a binary dot based on a pixel-by-pixel comparison of the original image with an array of thresholds (FIG. 1). Pixels of the original with intensities greater than their corresponding thresholds may be turned "on" (not printed or printed white) in the final halftoned image while pixels less than their corresponding thresholds may be turned "off" (printed or printed black). For large images, the threshold array is tiled end-to-end until all pixels of the original have a corresponding threshold.

In FIG. 1, we demonstrate an exemplary process of dither array halftoning where the original, continuous-tone image may be thresholded according to an 8 pixel by 8 pixel dither array. Here, we show the original image divided into sub-blocks representing how the dither array, after tiling end-to-end, may be lined up with the pixels of the complete image. Highlighted in the center of the figure is a pixel from the original image sub-block along with its corresponding threshold within the dither array. Because the original pixel intensity of 38 is larger than its threshold value of 23, the final halftoned pixel may be set to 1.

Because each pixel is processed independently of its neighboring pixels, dither array techniques may be referred to as a point process. Error diffusion is a neighborhood process where the conversion of a particular pixel to a binary value may be decided, in part, according to the conversion of its neighboring pixels. Specifically, in error diffusion, each pixel of the image may be processed one at a time along a pre-defined processing path or raster. The most common processing path, but not the only one that may be used, is to start with the top, left-most pixel and then proceed to the right, one pixel at a time. Upon completion of the first row, the next pixel to be processed will be the left-most pixel in the second row traveling from left to right and then row by row working from the top, to the bottom.

Now in the processing of a particular pixel, x[n] may be quantized according to a threshold value T such that values of x[n] larger than T are set to 1 while values less than T are set to 0. In order to refer to the output image value corresponding to x[n], we will use the notation y[n]. The resulting quantization error, $x_e[n]$, is the difference between the final, binary value and the pre-processed gray level x[n] such that $x_e[n]$=y[n]−x[n]. This quantization error may then be diffused into the neighboring pixels that have not yet been processed such that if x[n] was quantized to 0, then the excess light intensity above 0 stored in x[n] may be added to the intensity values of the neighboring pixels, making those pixels slightly brighter. If, instead, x[n] was quantized to 1, then the gap in brightness from x[n] to 1 may be taken from the neighboring pixels such that their brightness level is decreased. The effect of this is that the total sum of brightness values across of small region of X and Y may generally be near equal.

Now the resulting visual texture created by the distribution of printed dots produced by error diffusion may be controlled by the many parameters that compose the error diffusion algorithm. In particular, the error filter that implements the distribution of quantization error may be strongly tied to the resulting distribution of dots. Furthermore, varying such parameters as the quantization threshold T, from pixel to pixel, may have a dramatic impact on the resulting dot distribution. Even the raster path that defines the order in which pixels are processed may play a role. Generally, the best error diffusion variants may be the ones that create a smooth, homogeneous distribution of printed dots at all gray levels without adding any directional correlation between pixels such as would occur by placing dots close together along the diagonal axes.

Mathematically, the error diffusion process is described according to the conversion of the original continuous-tone pixel value x[n] into the binary pixel value y[n] using the following equation:

$$y[n] = \begin{cases} 1, & \text{if } (x[n] + x_e[n]) \geq T \\ 0, & \text{otherwise} \end{cases}$$

where $x_e[n]$ represents the quantization error from already processed pixels. Specifically, $x_e[n]$ may be not only from the just processed pixel prior to $x[n]$ but may, on the other hand, be from a window of previously processed pixels surrounding $x[n]$. The size of this window may be defined according to an error filter such that:

$$x_e[n] = \sum_{i=1}^{M} b_i y_e[n - n_i]$$

with $y_e[n-n_i] = y[n-n_i] - (x[n-n_i] + x_e[n-n_i])$. In these equations, $n_i$ represents a difference vector with respect to n that, when subtracted from n, produces an index of an $i^{th}$ pixel of M pixels in the window around $x[n]$. The diffusion coefficients $b_i$, which regulate the proportions to which the quantization error at pixel $x[n-n_i]$ transfers or diffuses into neighboring pixels, may be chosen such that when added together, the coefficients sum to 1.

In modern printing devices capable of printing more than one output condition, the process of digital halftoning may be replaced with a process of digital multitoning. For example, the Epson Stylus Pro 9800® is a wide-format inkjet printer equipped with inkjet heads capable of printing any one of three unique droplet sizes. It also employs two shades of cyan ink, two shades of magenta ink, and three shades of black ink. This device is, therefore, capable of printing 16 unique output conditions of cyan, 16 unique output conditions of magenta, 4 unique output conditions of yellow, and 64 unique output conditions of black. The term output condition is used to encapsulate the notion of no dot being printed as being a possible output level. The specific number of output conditions for any particular color may be derived according to the number of unique droplet sizes (no dot, small dot, medium dot, and large dot) raised to a power equal to the number of shades of ink for that particular color. So in the case of cyan and magenta, the number of output conditions is $4^2$, while black is $4^3$, and yellow is $4^1$.

With regards to the conversion of the input image intensity values into corresponding output conditions, various approaches have been proposed and implemented. In the case of the Epson Stylus Pro 9800®, many processes treat the dark and light inks as separate color components such that a CMYK image may be separated into eight separate, monochrome images, where each image corresponds to an available ink. Each of these eight monochrome images may then be processed by a multitoning algorithm that may convert input image pixels into output images composed of, e.g., two digital bits per pixel, or four unique output conditions. Typically, these multitoning processes may be applied independently of one another using either a dither array or error diffusion based approach. There are, of course, methods of multitoning that may treat the dark and light inks as being a single color channel that, in the case of the Epson Stylus Pro 9800®, has 16, 64, or 4 possible output conditions.

Regardless of which of the two approaches, the process of multitoning can be achieved by means of traditional dither arrays or of error diffusion. With regards to multitoning by means of error diffusion, multitoning may be achieved by replacing the binary quantizer with an N-level quantizer, where N is the number of available output conditions, and the selected condition may be chosen as the one nearest in intensity level to the accumulated pixel value, $x[n]+x_e[n]$. Mathematically, we can write this relationship as:

$$y[n] = \arg\min_{g_i}((x[n]+x_e[n])-g_i)^2$$

where $g_i$ is the output intensity level taken from the set of available output conditions $\{g_i: i=1, 2, \ldots, N\}$. It is the index, i, that may be used by the print head to specify which of the available droplet sizes to print at the subject pixel location.

Using dither arrays, multitoning may be achieved, at each pixel, by first choosing the two available output conditions, $g_i$ and $g_j$, where $g_i$ is the intensity of the largest output condition that is less than the subject input pixel, $x[n]$, and $g_j$ is the intensity of the smallest output condition that is greater than $x[n]$. From $g_i$ and $g_j$, the scalar term, l, may be defined as:

$$l=(x[n]-g_i)/(g_j-g_i)$$

such that $y[n]$ is set equal to $g_i$, if l is less than the corresponding dither array threshold, or $g_j$, if l is greater than the corresponding threshold. We note that this process, we have assumed that the condition "equal to" will not occur, but if it does, it depends on the specific implementation as to how one would address this situation. In the case where $x[n]$ is equal to an available output condition intensity, then $y[n]$ may be set equal to that same intensity without calculating l. If l is necessary, than it is up to the device manufacturer to determine if $y[n]$ is equal to $g_i$ or $g_j$ in the case where l is equal to the dither array threshold value.

Now regardless of which of the two multitoning schemes is implemented, a problem with using N-level quantizers is that they may produce banding artifacts where areas of solid gray can be seen near available output condition intensities. It has been a goal of numerous investigators to break up these bands by forcing all output intensites to be composed of at least two available output conditions. Many of these methods may focus on equalizing the distribution of mean square error (MSE) between the halftoned and the original image by distributing the MSE uniformly over all the gray levels. Ochi, in H. Ochi, "High Quality Multilevel Error Diffusion with Layered Structure," $140^{th}$ *Research Meeting for Image Processing and Communication*, Society of Electronic Communication in Japan, pp. 17-20, 1994, has addressed the same problem by iterating the error diffusion with a layered structure to remove the contouring at midtones. This is at the expense of increasing the deviation in the uniform density areas. Sugiura and Makita, in S. Sugiura and T. Makita, "An Improved Multilevel Error Diffusion Method," in *Recent Progress in Digital Halftoning II*, R. Eschbach, ed., IS&T, Springfield, Va., pp. 120-126, 1999, developed a new multitoning algorithm, based on error diffusion, by adding noise to increase the deviation around the density printed by the ink of intermediate gray level.

With regards to threshold array screening, multitoning can be achieved by scaling the screen to a certain intermediate range, before thresholding. Miller and Smith, in R. Miller and C. Smith, "Mean-Preserving Multilevel Halftoning Algorithm," in *Proceedings, SPIE—The International Society of Optical Engineering: Human Vision, Visual Processing and Digital Display IV*, J. P. Allebach and B. E. Rogowitz, eds., vol. 1913, SPIE, pp. 367-377, February 1993, described an implementation of multilevel halftoning, in which a modularly addressed matrix is used to store pointers to a series of dither look-up tables (LUTs), instead of actual dither values. In this method, the results of screening each of the possible input levels are precalculated and stored in these LUTs. A major advantage of this LUT based approach is that any conceivable dot growth pattern can be specified, hence smoother visual transition can be achieved at intermediate tones, getting rid of the banding artifacts.

Yu et al., in, e.g., K. Spaulding, Q. Yu, K. J. Parker, and R. Miller, "Improved Digital Multitoning with Overmodulation Scheme," *Proceedings of SPIE*, pp. 362-373, 1998 and K. Spaulding, Q. Yu, K. J. Parker, and R. Miller, "Digital Multitoning Evaluation with Human Visual Model," in *Recent Progress in Digital Halftoning II*, R. Eschbach, ed., IS&T, Springfield, Va., pp. 51-57, 1999, introduced an over-modulation method to achieve a smoother transition at the intermediate output levels. A preprocessing step was added before the screening, where the input pixel value was checked to see whether it was inside a predetermined range of any intermediate output levels. If not, this pixel was passed to the screening stage, else the overmodulation function was called to modify the input pixel value before passing it to the screen. This was a mean preserving process, and with this simple method, the dot patterns, around the intermediate output levels, could be manipulated to achieve the desired halftone patterns. Such stochastic screening based methods may trade off memory for faster execution. Error diffusion, on the other hand, may trade off execution speed for a memory efficient implementation.

In the following discussion, we introduce a novel multitoning technique that may decompose the original image into intermediate, printable gray-scale images, using some constrained modulation function, where each gray-scale image may correspond to an available, printable output condition. Each intermediate gray-scale image may then be halftoned using, e.g., a traditional error diffusion or threshold array screening process with the binarized channels recombined according to some recombination rule, to get the desired multitone.

Figure 2:
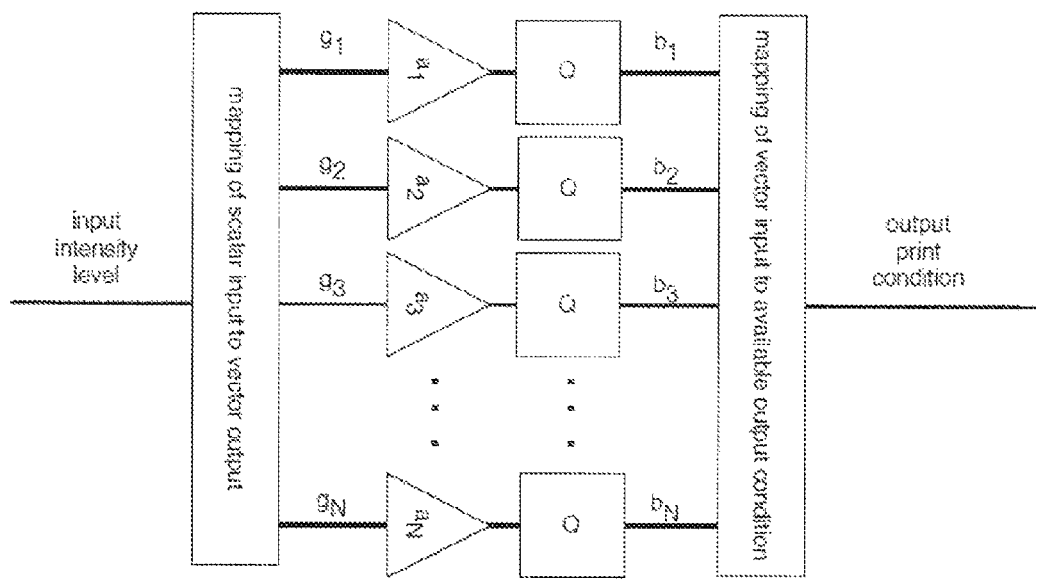
FIG. 2 is a block diagram showing an embodiment of the invention.
Figure 3:
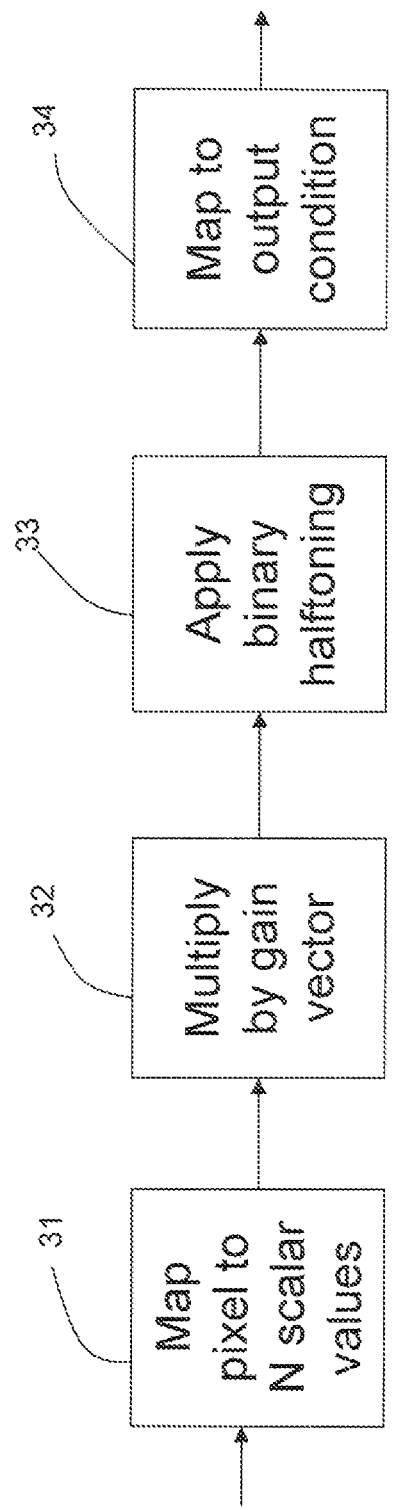
FIG. 3 is a flowchart illustrating a method according to various embodiments of the invention.

As illustrated in FIGS. 2 and 3, the proposed process may begin with a pixel from a monochrome (single color) input image that may have an input intensity level ranging from some minimum level (0.0) to a maximum level (1.0) corresponding to an intensity of color to be printed at a corresponding location on the printed page. For the purpose of printing color images, the associated primary colors of the input image may be processed one at a time, using the proposed process. This input intensity level, corresponding to a pixel of the monochrome input image, may be used as an input to a mapping function 31 that may convert the input intensity level into a vector of N scalar values, each ranging from a common minimum (0.0) and maximum (1.0) value. The number, N, may correspond to a total number of available output conditions.

For the purpose of this discussion, an output condition refers to an available droplet size that the printing mechanism can produce at a given output (printed dot) location, but those skilled in the art will also recognize that an output condition may also include a unique combination of droplet sizes and/or pigment/dye intensities made available by having multiple ink sources such as having a light and dark shade of a particular color.

The mapping, itself, can be implemented by a range of methods including direct calculation of a pre-defined function or by means of a look-up table where the input intensity level is used to index a position in memory storing the associated set of intensity levels $g_1, g_2, g_3, \ldots, g_N$. This mapping may also include a combination of a mathematical or logical function applied to the input intensity level to derive a memory location or as an index into a memory location whereby a unique function is derived.

Having derived the vector, $[g_1, g_2, g_3, \ldots, g_N]$, of intensity levels corresponding to the set of N available output conditions, the individual intensity levels, $g_1, g_2, g_3, \ldots, g_N$, may then be amplified 32 by scalar values, $a_1, a_2, a_3, \ldots, a_N$, to adjust the mapping process to account for changes in printed output resolution. As an example, printing 720×720 pixels per square inch has four times as many available printed dots as printing at 360×360 pixels per square inch. As such, the printing device can output four times the volume of ink at this higher resolution. For this reason, the incoming input intensity may typically be modulated by a scalar factor that reduces its intensity by a factor of four. In so doing, the input intensity may show quantization artifacts in the output when using fixed point arithmetic.

For example, the input image may be specified at a fixed memory width of 8 bits per pixel such that there are 256 unique intensity levels ranging from 0 (0000000b) to 255 (11111111b), where 'b' indicates that the number is specified with base 2 (binary). So reducing this number by a factor of four means that there will only be 64 unique intensity levels ranging from 00000b to 111111b. This reduction in available input levels may result in banding artifacts in the printed output when 256 unique levels would not have had this effect. And for this reason, many modern inkjet printers may specify input intensity levels using 12 bits per pixel, which has 4096 unique intensity levels, such that the reduction in available input intensity levels goes unnoticed, but this has a consequence of requiring more memory as well as higher computation complexity in manipulating 12 bits per pixel integers. By placing the modulation of intensity levels with the vector, $[g_1, g_2, g_3, \ldots, g_N]$, instead of the input intensity level, the likelihood of these banding artifacts may be reduced, even at 8 bits per pixel.

Having the modulated vector, $[a_1g_1, a_2g_2, a_3g_3, \ldots, a_Ng_N]$, one may next apply a binary halftoning scheme 33 to each of the N available $a_ig_i$ components. This halftoning process can be by any of a number of halftoning methods, including dither array or error diffusion. Furthermore, these halftoning processes can be performed independently or in a correlated fashion, in which the output of the $i^{th}$ channel may affect the quantization of the $j^{th}$. For example, halftoning can be performed under a stacking constraint where the output of the $i^{th}$ channel can be output-high if and only if the output of the $(i-1)^{th}$ channel is also output-high. After processing each of the N $a_ig_i$ components, the resulting binary outputs may then produce the vector, $[b_1, b_2, b_3, \ldots, b_N]$.

Finally, the vector, $[b_1, b_2, b_3, \ldots, b_N]$, may be processed by means of a mapping function to specify a unique one of N available output conditions 34. This mapping can be implemented by a range of methods including, e.g., direct calculation of a pre-defined function, applied to $[b_1, b_2, b_3, \ldots, b_N]$, or by means of a look-up table where the vector may be used to index a position in memory storing the associated output condition. This mapping 34 may also include a combination of a mathematical or logical function applied to $[b_1, b_2, b_3, \ldots, b_N]$ to derive a memory location or as an index into a memory location whereby a unique function is derived. For example, the binary components may be summed together to form a fixed-width binary number that may then be used as a unique binary codeword (two bits, for example) for specifying to the printing mechanism to output a small (01b) to medium (10b) to large (11b) droplet. The resulting output condition (codeword) can then be sent directly to the printing mechanism to control the printed output directly, or stored in memory or some processing pipeline for later printing.

Figure 4:
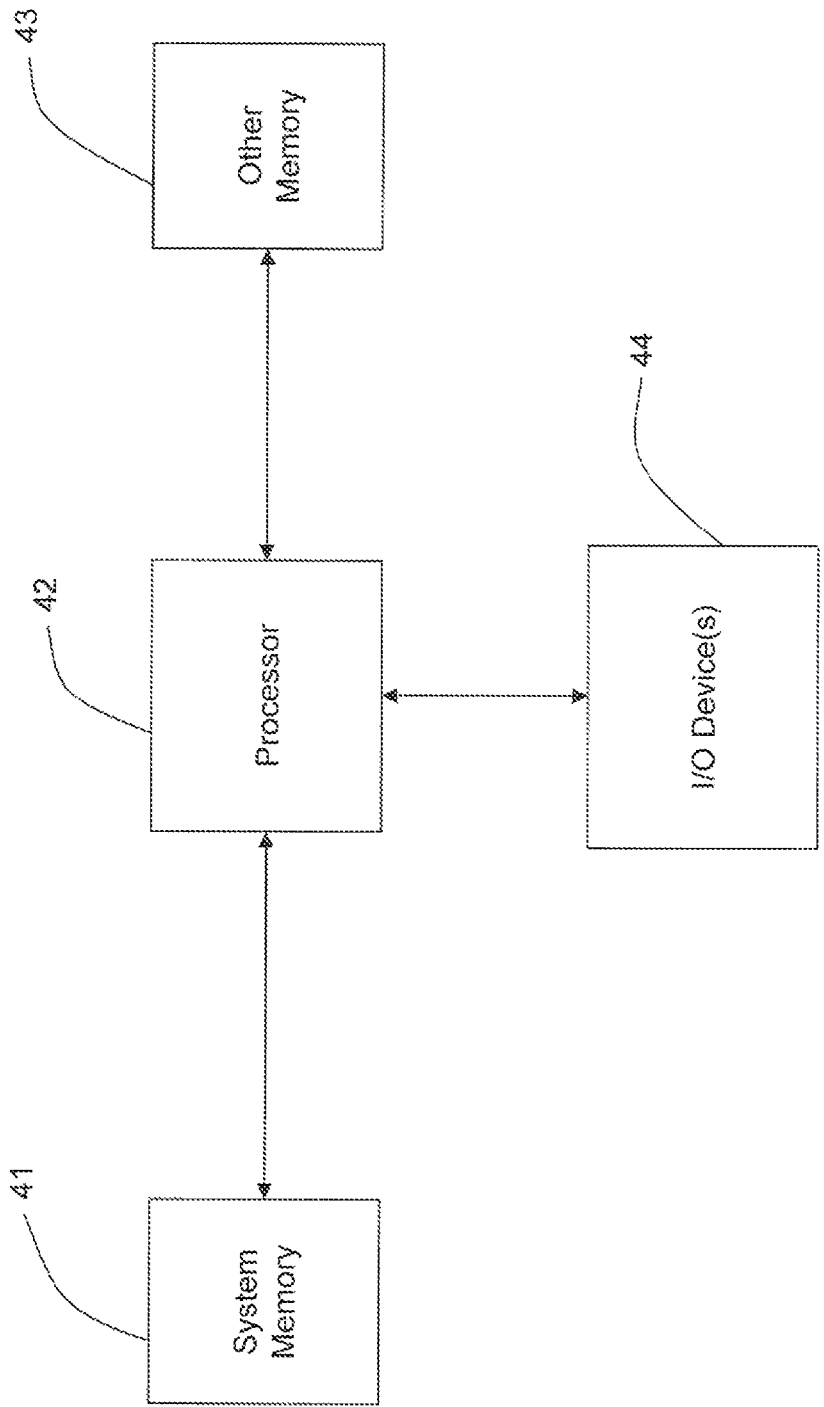
FIG. 4 is a block diagram of a system that may be used in implementations of various embodiments of the invention.

Various embodiments of the invention may comprise hardware, software, and/or firmware. FIG. 4 shows an exemplary system that may be used to implement various forms and/or portions of embodiments of the invention. Such a computing system may include one or more processors 42, which may be coupled to one or more system memories 41. Such system memory 41 may include, for example, RAM, ROM, or other such machine-readable media, and system memory 41 may be used to incorporate, for example, a basic I/O system (BIOS), operating system, instructions for execution by processor 42, etc. The system may also include further memory 43, such as additional RAM, ROM, hard disk drives, or other physical processor-readable media. Processor 92 may also be coupled to at least one input/output (I/O) interface 44. I/O interface 44 may include one or more user interfaces, as well as readers for various types of storage media and/or connections to one or more communication networks (e.g., communication interfaces and/or modems), from which, for example, software code may be obtained or software code may be provided. Furthermore, other devices/media, such as FPGAs, may also be attached to and interact with the system shown in FIG. 4.

Various embodiments of the invention have now been discussed in detail; however, the invention should not be understood as being limited to these embodiments. It should also be appreciated that various modifications, adaptations, and alternative embodiments thereof may be made within the scope and spirit of the present invention.

What is claimed is:

1. A method of converting a digital image comprising pixels corresponding to a plurality of intensities into a pattern of available output conditions, the method comprising:
    converting a scalar intensity value of a respective pixel into a vector containing N scalar values associated with the respective pixel, where N is greater than one, by applying one or more pre-determined mapping functions, thus forming a length-N vector corresponding to an available output condition;
    modulating the elements of said length-N vector by one or more pre-determined scalar values;
    binary-quantizing each element of said length-N vector into one of two quantized output levels to obtain a binarized length-N vector;
    converting the binarized length-N vector into the available output condition by a pre-determined mapping function; and
    outputting the resulting output condition to control a display.

2. The method of claim 1, wherein said binary-quantizing comprises applying a technique based on error diffusion.

3. The method of claim 1, wherein said binary-quantizing comprises applying a technique based on using one or more threshold arrays.

4. The method of claim 1, wherein the output condition for a pixel of continuous-tone input image corresponds to a fixed-bit codeword.

5. The method of claim 1, wherein said outputting comprises using the output condition to control a printing mechanism.

6. The method of claim 1, further comprising prior to said converting the scalar intensity value, producing said digital image from a color image mapped to a monochrome image space, wherein output conditions for the digital image correspond to output conditions for a particular color component of the color image.

7. The method of claim 6, wherein said monochrome image space is luminance.

8. The method of claim 6, wherein said producing comprises producing digital monochrome images for the respective color components of the color image and applying said converting the scalar intensity value, said modulating, said binary-quantizing, and said converting the binarized length-N vector to the resulting respective digital monochrome images.

9. The method of claim 1, further comprising downloading software that, upon execution by a processing device, causes implementation of operations including at least said converting the scalar intensity value of a pixel; said modulating; said binary-quantizing each element of said length-N vector into the one of the two quantized output levels to obtain the binarized length-N vector; and said converting the binarized length-N vector.

10. The method of claim 1, further comprising providing for downloaded software that, upon execution by a processing devices, causes implementation of operations including at least said converting the scalar intensity value of a pixel: said modulating: said binary-quantizing each element of said length-N vector into the one of the two quantized output levels to obtain the binarized length-N vector: and said converting the binarized length-N vector.

11. A non-transitory processor-readable medium containing instructions configured to cause a processing device to implement operations comprising:
    converting a scalar intensity value of a respective pixel of a digital image into a vector containing N scalar values associated with the respective pixel, where N is greater than one, by applying one or more pre-determined mapping functions, thus forming a length-N vector corresponding to an available output condition;
    modulating the elements of said length-N vector by one or more pre-determined scalar values;
    binary-quantizing each element of said length-N vector into one of two quantized output levels to obtain a binarized length-N vector;
    converting the binarized length-N vector into an available output condition by pre-determined mapping function; and
    outputting the resulting output condition to control a display.

12. The non-transitory processor-readable medium of claim 11, wherein said binary-quantizing comprises applying a technique based on error diffusion.

13. The non-transitory processor-readable medium of claim 11, wherein said binary-quantizing comprises applying a technique based on using one or more threshold arrays.

14. The non-transitory processor-readable medium of claim 11, wherein the output condition for a pixel of a continuous-tone input image corresponds to a fixed-bit codeword.

15. The non-transitory processor-readable medium of claim 11, wherein said outputting comprises using the output condition to control a printing mechanism.

16. The non-transitory processor-readable medium of claim 11, wherein the operations further comprise, prior to said converting the scalar intensity value, producing said digital image from a color image mapped to a monochrome image space, wherein output conditions for the digital image correspond to the output condition, for a particular color component of the color image.

17. The non-transitory processor-readable medium of claim 16, wherein said monochrome image space is luminance.

18. The non-transitory processor-readable medium of claim 16, wherein said producing comprises producing digital monochrome images for the respective color components of the color image and applying said converting the scalar intensity value, said modulating, said binary-quantizing, and said converting the binarized length-N vector to the resulting respective digital monochrome images.

19. An apparatus for converting a digital image comprising pixels, the apparatus comprising:
- a first mapping module configured to map a scalar intensity value of a respective pixel of the digital image into a vector of N scalar values associated with the respective pixel, where N is greater than one, by applying one or more pre-determined mapping functions, thus forming a length-N vector corresponding to an available output condition;
- a modulator configured to multiply elements of said length-N vector by one or more pre-determined scalar values;
- at least one binary quantizer configured to quantize each element of said length-N vector into one of two quantized output levels to obtain a binarized length-N vector; and
- a second mapping module configured to convert the binarized length-N vector into the available output condition by a pre-determined mapping function.

20. The apparatus of claim 19, wherein said at least one binary quantizer is configured to use a technique based on error diffusion.

21. The apparatus of claim 19, wherein said at least one binary quantizer is configured to use a technique based on using one or more threshold arrays.

22. The apparatus of claim 19, wherein the output condition for a pixel of a continuous-tone input image corresponds to a fixed-bit codeword.

23. The apparatus of claim 19, further comprising an output configured to provide the available output condition to a display device.

24. The apparatus of claim 23, wherein the display device comprises a printing mechanism.

25. The apparatus of claim 19, wherein the apparatus is further to produce said digital image from a color image mapped to a monochrome image space, wherein output conditions for the digital image correspond to output conditions for a particular color component of the color image.

26. The apparatus of claim 25, wherein said monochrome image space is luminance.

27. The apparatus of claim 25, wherein the apparatus is to produce said digital image by producing digital monochrome images for the respective color components of the color image and applying the respective digital monochrome images as inputs to the first mapping module.

* * * * *